US012811502B2

(12) United States Patent
Battaglia et al.

(10) Patent No.: US 12,811,502 B2
(45) Date of Patent: Nov. 24, 2026

(54) ADAPTIVE CURRENT RAMPING FOR SMOOTH VOLTAGE REGULATOR MODE SWITCHING

(71) Applicant: STMicroelectronics International N.V., Geneva (CH)

(72) Inventors: Dorotea Battaglia, Milan (IT); Claudio Serratoni, Milan (IT)

(73) Assignee: STMicroelectronics International N.V., Geneva (CH)

( * ) Notice: Subject to any disclaimer, the term of this patent is extended or adjusted under 35 U.S.C. 154(b) by 104 days.

(21) Appl. No.: 19/055,199

(22) Filed: Feb. 17, 2025

(65) Prior Publication Data

US 2026/0246384 A1 Aug. 20, 2026

(51) Int. Cl.
*H02M 3/158* (2006.01)
*H02M 1/00* (2006.01)

(52) U.S. Cl.
CPC ......... *H02M 3/158* (2013.01); *H02M 1/0025* (2021.05)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088;

(Continued)

(56) References Cited

U.S. PATENT DOCUMENTS 6,411,119 B1 * 6/2002 Feldtkeller ........ H02M 3/33507
324/750.3
8,018,208 B1 9/2011 Kahn (Continued)

*Primary Examiner* — Jeffrey A Gblende
(74) *Attorney, Agent, or Firm* — Slater Matsil, LLP

(57) ABSTRACT

According to an embodiment, a voltage regulator includes a first transistor coupled between a supply voltage and an output node, an error amplifier comparing a feedback voltage to a reference voltage, and a slope compensation circuit. The slope compensation circuit includes a ramp-up circuit generating an increasing current and a current generation circuit providing a supply-dependent constant current based on the supply voltage. During transitions between operating modes, the slope compensation circuit draws either the increasing current when transitioning from regulated to supply voltage, or a decreasing current when transitioning from supply to regulated voltage. The decreasing current is generated by subtracting the increasing current from the supply-dependent constant current.

20 Claims, 6 Drawing Sheets

(58) Field of Classification Search
CPC ... H02M 1/0048; H05B 39/048; B23K 11/24; H04B 2215/069
See application file for complete search history.

(56) References Cited

U.S. PATENT DOCUMENTS

| | | | | |
|---|---|---|---|---|
| 9,130,474 | B2 * | 9/2015 | Hung | H02M 7/44 |
| 9,184,659 | B2 * | 11/2015 | Song | H02M 3/156 |
| 10,725,938 | B2 * | 7/2020 | Jiang | H02M 3/157 |
| 2007/0001751 | A1 | 1/2007 | Sundararaman | |
| 2013/0043856 | A1 | 2/2013 | Wang | |
| 2013/0314062 | A1 | 11/2013 | Notman | |
| 2021/0344271 | A1 | 11/2021 | Tao | |
| 2022/0052675 | A1 | 2/2022 | Archibald | |
| 2022/0210898 | A1 | 6/2022 | Avery, Jr. | |

* cited by examiner

ADAPTIVE CURRENT RAMPING FOR SMOOTH VOLTAGE REGULATOR MODE SWITCHING

TECHNICAL FIELD

The present disclosure generally relates to electronic systems and, in particular embodiments, to voltage regulators with adaptive current control for smooth mode transitions.

BACKGROUND

Voltage regulators provide various circuits and devices with stable and regulated power supply voltages. They ensure these systems' proper operation and reliability by maintaining a constant output voltage level despite variations in input voltage or load conditions. Voltage regulators find applications in various domains, including automotive electronics, consumer devices, industrial equipment, and telecommunications systems.

In many applications, voltage regulators are configured to operate efficiently across various input voltage levels. For example, in automotive systems, the battery voltage can vary significantly depending on the state of charge, alternator performance, and load conditions. Similarly, the voltage may decrease over time in battery-powered devices as it discharges.

Moreover, voltage regulators are often required to transition smoothly between different operating modes. These modes may include active mode, where the regulator regulates the output voltage, and low-power or sleep mode, where the regulator is disabled to conserve energy. Smooth transitions between these modes can help avoid voltage spikes, glitches, or other disturbances that could adversely affect the connected circuits. Abrupt changes in the output voltage during mode transitions can lead to undesired behavior, data corruption, or even damage to sensitive components.

The control loops in voltage regulators maintain output voltage regulation and stability. These control loops monitor the output voltage and adjust the regulator's operation accordingly. The choice of control scheme can depend on factors such as the desired transient response, stability requirements, and the specific characteristics of the regulator topology.

In addition to regulation accuracy and stability, other considerations in voltage regulator design can include power efficiency, transient response, noise performance, and protection features.

Transient response refers to the regulator's ability to respond to load current or input voltage changes quickly. The fast transient response can help maintain a stable output voltage and prevent voltage droops or overshoots.

Noise performance is another aspect, particularly in noise-sensitive applications such as audio systems, precision measurement equipment, and wireless communication devices. Voltage regulators should minimize output voltage ripple and noise to ensure signal integrity and avoid interference with sensitive circuits.

Further, voltage regulators often incorporate various protection features to ensure safe and reliable operation. These features may include over-voltage protection (OVP), under-voltage lockout (UVLO), over-current protection (OCP), and thermal shutdown (TSD). These protection mechanisms safeguard the regulator and the connected circuits from damage due to abnormal operating conditions or faults.

SUMMARY

Technical advantages are generally achieved by embodiments of this disclosure, which describe voltage regulators with adaptive current control for smooth mode transitions.

A first aspect relates to a voltage regulator circuit, comprising a first transistor having a first terminal, a second terminal, and a control terminal, the first terminal coupled to a supply voltage, a second terminal of the first transistor coupled to an output node; an error amplifier having a first input, a second input, and an output, the first input coupled to a reference voltage, the output coupled to the control terminal of the first transistor; a feedback network coupled between the output node and a ground terminal, the feedback network configured to provide a feedback voltage to the second input of the error amplifier; and a slope compensation circuit coupled to the feedback network, the slope compensation circuit comprising a ramp-up circuit configured to generate an increasing current, and a current generation circuit configured to generate a supply-dependent constant current based on the supply voltage, wherein the slope compensation circuit is configured to draw the increasing current during a first mode transition from a regulated voltage to the supply voltage, and draw a decreasing current during a second mode transition from the supply voltage to the regulated voltage, the decreasing current generated by subtracting the increasing current from the supply-dependent constant current.

A second aspect relates to a slope compensation circuit for a regulator, the slope compensation circuit comprising a ramp-up circuit configured to generate an increasing current; and a current generation circuit configured to generate a supply-dependent constant current based on a supply voltage of the regulator, wherein the slope compensation circuit is configured to draw the increasing current during a first mode transition from a regulated voltage to the supply voltage, and draw a decreasing current during a second mode transition from the supply voltage to the regulated voltage, the decreasing current generated by subtracting the increasing current from the supply-dependent constant current.

A third aspect relates to a method for controlling a voltage regulator circuit, the method comprising generating, by a ramp-up circuit, an increasing current; generating, by a current generation circuit, a supply-dependent constant current based on a supply voltage; drawing, by a slope compensation circuit, the increasing current during a first mode transition from a regulated voltage to the supply voltage; drawing, by the slope compensation circuit, a decreasing current during a second mode transition from the supply voltage to the regulated voltage, the decreasing current generated by subtracting the increasing current from the supply-dependent constant current; providing, by the feedback network, a feedback voltage to an input of an error amplifier; comparing, by the error amplifier, the feedback voltage to a reference voltage to generate an error signal; providing the error signal to a control terminal of a first transistor; and regulating an output voltage at an output node based on the error signal, the output node coupled to a second terminal of the first transistor, and a first terminal of the first transistor coupled to the supply voltage.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
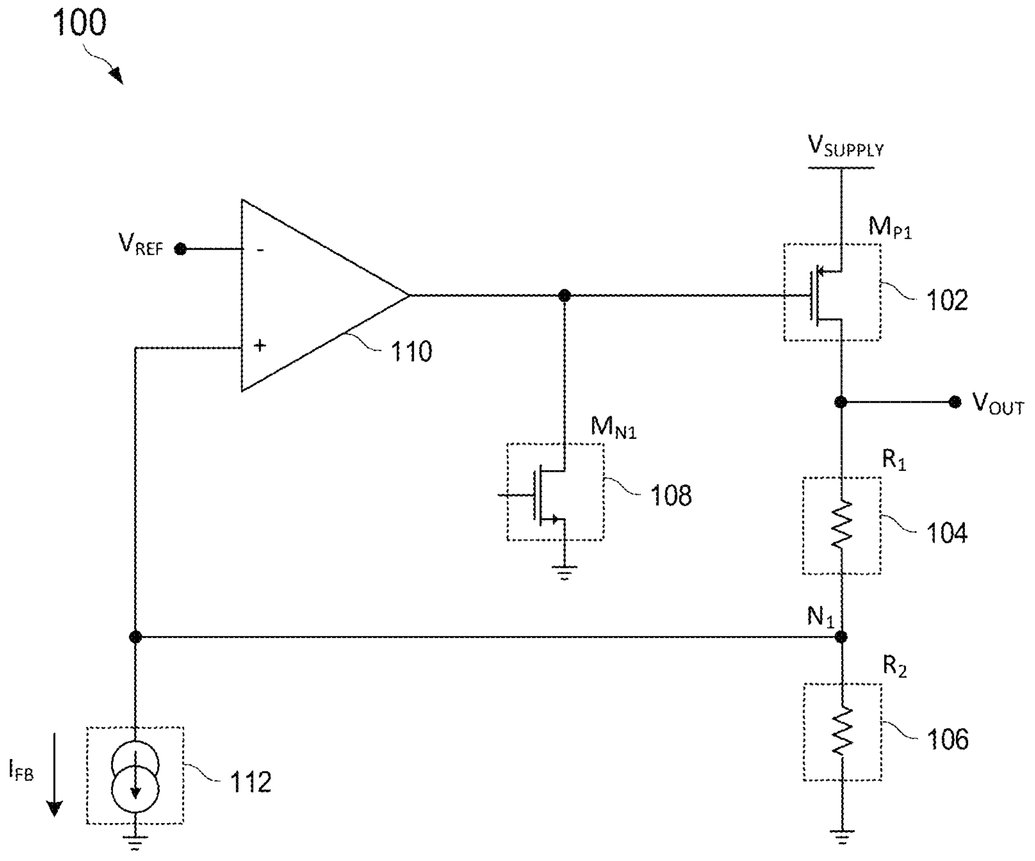
FIG. 1 is a schematic of a regulator.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of voltage regulators in automotive applications, it should also be appreciated that these inventive aspects may also apply to other power management circuits and systems. In particular, aspects of this disclosure may similarly apply to power converters, power supplies, battery management systems, and other electronic circuits where smooth transitions between operating modes, adaptive control, and efficient operation across varying conditions are desirable.

The present disclosure describes a voltage regulator with an adaptive current control mechanism for smooth transitions between different operating modes. In embodiments, the voltage regulator includes a current generator circuit that produces two power-dependent currents with different accuracy. The supply-dependent current with higher accuracy can be generated by subtracting the supply-dependent current from the reference current.

In embodiments, the current generator circuit includes a first branch that generates the supply-dependent current proportional to the supply voltage and a second branch that generates a current proportional to the supply voltage and the reference voltage. The latter can be obtained by mirroring the supply-dependent current and subtracting the reference voltage-dependent current.

In embodiments, the voltage regulator includes a ramp generator circuit coupled to the current generator circuit. The ramp generator circuit can generate a decreasing current ramp from the maximum feedback current to zero during a transition from the supply voltage to a regulated output voltage. Conversely, during a transition from the regulated output voltage to the supply voltage, the ramp generator circuit can increase the current ramp from zero to the maximum feedback current. The generated current ramp can be injected into a feedback network of the voltage regulator to control the output voltage transition.

In embodiments, the ramp generator circuit includes a first sub-circuit for generating the decreasing current ramp and a second sub-circuit for generating the increasing current ramp. A mode transition signal can control the selection between the first and second sub-circuits. The first sub-circuit uses the maximum feedback current and the increasing current ramp circuit to generate the decreasing current ramp. In contrast, the second sub-circuit employs a ramp-up circuit to generate the increasing current ramp.

By employing an adaptive current control mechanism, the voltage regulator can achieve smooth and controlled transitions between different operating modes, such as low-power and active modes. The supply-dependent nature of the maximum feedback current can ensure that the transition time remains consistent across different supply voltage levels, eliminating startup delays that may occur in fixed-current approaches.

The adaptive current control mechanism can be integrated into various voltage regulator topologies to achieve smooth mode transitions and efficient operation across a wide range of supply voltages. The proposed voltage regulator can find applications in various domains where smooth and controlled transitions between operating modes are desired, such as automotive systems, battery-powered devices, and integrated power management circuits. Advantageously, the proposed voltage regulator can improve system stability, reliability, and efficiency by providing a consistent transition time and eliminating startup delays. These and other details are discussed further below.

FIG. 1 illustrates a schematic of a regulator 100. Regulator 100 includes a p-channel transistor ($M_{P1}$) 102, a first resistor ($R_1$) 104, a second resistor ($R_2$) 106, an n-channel transistor ($M_{N1}$) 108, an error amplifier 110, and a feedback current source 112, which may (or may not) be arranged as shown. Regulator 100 may include additional components not shown.

Many automotive devices include at least one linear regulator, such as the regulator 100, that supplies power to internal circuits. More recently, regulators have been required to operate in low and high-power modes.

During the high-power mode phase (i.e., normal operation), the regulator functions normally, providing a regulated voltage ($V_{REG}$) at its output. During this phase, no current flows are pulled by the feedback current source (the feedback current ($I_{FB}$) equals zero). The current flows from the supply voltage ($V_{SUPPLY}$) through the p-channel transistor ($M_{P1}$) 102 and the first resistor ($R_1$) 104 to the second resistor ($R_2$) 106, generating the output voltage ($V_{OUT}$).

In contrast, during the low-power mode phase, the regulator is turned OFF, and the output voltage ($V_{OUT}$) transitions to the supply voltage ($V_{SUPPLY}$)—the supply voltage ($V_{SUPPLY}$) can be a battery, allowing the circuit to minimize power consumption.

During the transition between the high-power and low-power modes, the current flows from the supply voltage ($V_{SUPPLY}$) through the p-channel transistor ($M_{P1}$) 102 and the first resistor ($R_1$) 104, while the feedback current source (112) pulls current from the node ($N_1$) to ground through the second resistor ($R_2$) 106, controlling the output voltage ($V_{OUT}$). The voltage at the node ($N_1$) between the first resistor ($R_1$) 104 to the second resistor ($R_2$) 106 is read by the error amplifier 110 to control the transition of the output voltage ($V_{OUT}$).

Transitioning the regulator output between the two phases is performed in a controlled manner to avoid potential issues. One concern is the undershoot and overshoot in the output voltage during the transition from supply to regulated voltage. This can be caused by the control loop's response time delay. Another issue can be the impact on downstream circuits due to rapid voltage changes.

The controlled voltage transition can be achieved by applying a controlled current ramp from the feedback current source 112. The current ramp exhibits specific characteristics to control the output voltage ($V_{OUT}$). Firstly, the current ramp decreases when transitioning from the supply voltage ($V_{SUPPLY}$) to the regulated voltage ($V_{REG}$), allowing the output voltage to be gradually decreased. Secondly, the current ramp increases when transitioning from the regulated voltage ($V_{REG}$) to the supply voltage ($V_{SUPPLY}$), enabling the output voltage to be smoothly raised.

When an enable signal indicates a phase change, regulator 100 is configured to increase or decrease its output voltage ($V_{OUT}$) value in a controlled manner for a specific duration. In the case of a supply-to-regulated voltage transition, the solution can be to immediately close the control loop, setting the initial target voltage close to the supply voltage. The target voltage is then linearly decreased until it reaches the desired regulated voltage ($V_{REG}$). Conversely, for a regulated-to-supply voltage transition, the target voltage is linearly increased until it reaches the battery voltage; at this point, the control loop is opened.

During normal operation, regulator 100 provides a stable and regulated voltage ($V_{REG}$) by controlling the current flow through the p-channel transistor ($M_{P1}$) 102. The error amplifier 110 compares a fraction of the output voltage ($V_{OUT}$), determined by the voltage divider formed by the first resistor ($R_1$) 104 and the second resistor ($R_2$) 106, with a reference voltage ($V_{REF}$). The output of the error amplifier 110 adjusts the gate voltage of the p-channel transistor ($M_{P1}$) 102, thereby regulating the current flow and maintaining a constant output voltage ($V_{OUT}$).

The input signal to the n-channel transistor ($M_{N1}$) 108 is a digital signal that controls the operation of the regulator 100. When the input signal is high (logic '1'), the error amplifier 110 is OFF and the n-channel transistor ($M_{N1}$) 108 is turned ON, pulling the gate of the p-channel transistor ($M_{P1}$) 102 to ground and disabling the regulator (i.e., bypassing the regulator). This corresponds to the low-power mode where the output voltage ($V_{OUT}$) is directly coupled to the supply voltage ($V_{SUPPLY}$)—the p-channel transistor ($M_{P1}$) 102 acts as a switch to provide the supply voltage ($V_{SUPPLY}$) at the output terminal of the regulator 100.

When transitioning from low-power to high-power mode, the feedback current source 112 is enabled and programmed to generate a decreasing current ramp-closed loop operation of the regulator 100. The falling edge of the input signal to the n-channel transistor ($M_{N1}$) 108 triggers the transition from low-power to high-power mode. The feedback current ($I_{FB}$) starts at a maximum value ($I_{MAX}$), corresponding to the falling edge of the input signal to the n-channel transistor ($M_{N1}$) 108. The feedback current ($I_{FB}$) linearly decreases from the maximum value to zero. The decreasing current ramp is subtracted from the feedback voltage at the non-inverting input of the error amplifier 110, causing the output voltage ($V_{OUT}$) to gradually decrease towards the regulated voltage ($V_{REG}$). The decreasing ramp's slope determines the output voltage transition rate, ensuring a smooth and controlled transition while minimizing undershoot.

During the high-power mode, the feedback current source 112 is disabled, allowing the error amplifier 110 to regulate the output voltage ($V_{OUT}$) based solely on the reference voltage ($V_{REF}$) and the feedback from the voltage divider. In this mode, regulator 100 maintains the output voltage at the desired regulated level ($V_{REG}$).

The feedback current ($I_{FB}$) follows an increasing ramp profile during the transition from high-power to low-power mode. The gate terminal of the first n-channel transistor ($M_{N1}$) does not go immediately high, but rather, the transition occurs when the output voltage ($V_{OUT}$) has reached the supply voltage ($V_{SUPPLY}$). The feedback current ($I_{FB}$) linearly increases from zero to the maximum value ($I_{MAX}$). The increasing current ramp is subtracted from the feedback voltage, causing the output voltage ($V_{OUT}$) to gradually increase from the regulated voltage ($V_{REG}$) towards the supply voltage ($V_{SUPPLY}$). The increasing ramp's slope determines the output voltage transition rate, ensuring a smooth and controlled transition while minimizing overshoot.

When the input signal transitions from high to low (logic '0'), the n-channel transistor ($M_{N1}$) 108 is turned OFF, allowing the regulator to resume normal operation in high-power mode. The error amplifier 110 takes control of the gate voltage of the p-channel transistor ($M_{P1}$) 102, regulating the output voltage ($V_{OUT}$) based on the reference voltage ($V_{REF}$) and the feedback from the voltage divider formed by the first resistor ($R_1$) 104 and the second resistor ($R_2$) 106.

Accordingly, during the transitions between the high-power and low-power modes, the feedback current ($I_{FB}$) generated by the feedback current source 112 controls the output voltage ($V_{OUT}$) transitions of the regulator 100. The feedback current ($I_{FB}$) profile can be configured to provide smooth and controlled transitions between low-power and high-power modes. The linear increasing and decreasing ramps of the feedback current ($I_{FB}$) help to minimize undershoot, overshoot, and disturbances to downstream circuits. At the same time, the maximum value ensures optimal performance across the operating voltage range.

In high-power mode, the first transistor ($M_{N1}$) 108 is OFF and remains OFF until the transition to low-power mode is completed, which corresponds to the output voltage ($V_{OUT}$) being equal to the supply voltage ($V_{SUPPLY}$).

The duration of the increasing and decreasing ramps can be chosen to be longer than the loop closure delay and the discharge time of the load capacitance. This ensures that the control loop has sufficient time to respond to the output voltage changes and that the load capacitance can be charged or discharged smoothly. If the operation of the regulator is not controlled properly during the two transitions (i.e., lack of smooth passage between the transitions), there is a likelihood of fast transients at the output voltage ($V_{OUT}$).

To address these challenges, it is desirable for regulator 100 to employ techniques to ensure smooth and controlled transitions between the two power modes. As shown, regulator 100 includes a feedback current source 112 that regulates the output voltage during mode transitions, minimizing undershoot and overshoot. Additionally, the control loop of the regulator 100 can be designed to respond quickly to changes in the output voltage, reducing the impact of fast voltage switching on downstream circuits.

The output voltage ($V_{OUT}$) of the regulator 100 can be expressed by the equation:

$$V_{OUT} = V_{REF} \times \frac{(R_1 + R_2)}{R_2} + I_{FB} \times R_1.$$

In this equation, $V_{REF}$ represents the reference voltage ($V_{REF}$), R1 and R2 are the resistances of the first resistor ($R_1$) 104 and the second resistor ($R_2$) 106 in the voltage divider, and $I_{FB}$ is the feedback current ($I_{FB}$) generated by the feedback current source 112.

The second term in the equation (i.e., $I_{FB} \times R_1$) adjusts the output voltage ($V_{OUT}$) to fit the regulation requirements during transitions between the regulated voltage ($V_{REG}$) and the supply voltage ($V_{SUPPLY}$). By controlling the feedback current ($I_{FB}$), regulator 100 can smoothly transition the output voltage ($V_{OUT}$) from the regulated voltage ($V_{REG}$) to the supply voltage ($V_{SUPPLY}$) and vice versa.

The value of the second term represents the voltage difference between the supply voltage ($V_{SUPPLY}$) and the regulated voltage ($V_{REG}$). By adding this term from the first term (i.e., $$V_{REF} \times \frac{(R_1 + R_2)}{R_2}\Bigg),$$

regulator 100 can effectively adjust the output voltage ($V_{OUT}$) to match either the supply voltage ($V_{SUPPLY}$) or the regulated voltage ($V_{REG}$), depending on the operating mode and the desired transition characteristics.

Conventionally, a slope compensation circuit generates the increasing current ramp to transition from the regulated voltage ($V_{REG}$) to the supply voltage ($V_{SUPPLY}$). On the other hand, the decreasing current ramp needed for the transition from the supply voltage ($V_{SUPPLY}$) to the regulated voltage ($V_{REG}$) was obtained by subtracting an increasing current ramp from a constant current. With this approach, the current ramp remained the same for any supply voltage ($V_{SUPPLY}$). To function correctly within the regulator, the maximum current of the bias current was designed to satisfy the condition of the output voltage ($V_{OUT}$) equaling the supply voltage ($V_{SUPPLY}$).

However, this known solution had certain drawbacks, particularly in the case of regulators with a large supply voltage range. Assuming the circuit was designed so that the maximum current of the bias current satisfied the condition that the maximum supply voltage ($V_{SUPPLY\_MAX}$) equals the output voltage ($V_{OUT}$), a start-up delay was observed during the transition from the battery voltage to the regulated voltage, especially for low battery values. This delay was attributed to the incorrect value of the current at the initial instant. The maximum current required to satisfy the condition that the maximum supply voltage ($V_{SUPPLY\_MAX}$) equals the output voltage ($V_{OUT}$) was different from the maximum current needed to satisfy the condition that the minimum supply voltage ($V_{SUPPLY\_MIN}$) equals the output voltage ($V_{OUT}$). Consequently, the current ramp generated by the conventional slope compensation circuit was not optimized for the entire supply voltage range, leading to the observed start-up delay at lower battery voltages.

The mismatch between the maximum current values for different supply voltages highlights the limitations of the existing solution. While the slope compensation circuit provided a simple means to generate the increasing and decreasing current ramps, it fails to adapt effectively to the varying supply voltage conditions. The lack of adaptability results in suboptimal performance, particularly during the transition from the battery voltage to the regulated voltage at lower battery levels. The start-up delay introduced by the incorrect current value at the initial instant compromises the smooth and seamless transition between operating modes.

Figure 2:
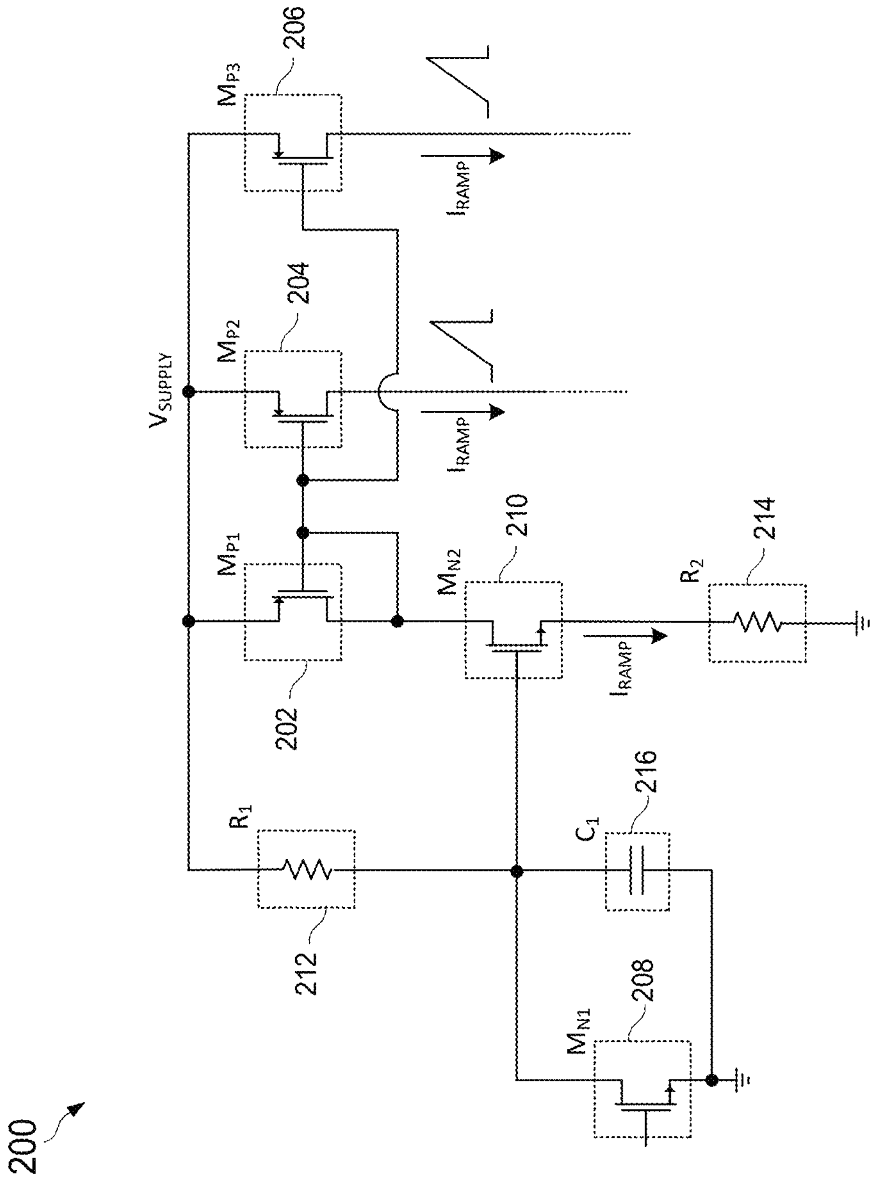
FIG. 2 is a schematic of an embodiment ramp-up circuit.

FIG. 2 illustrates a schematic of an embodiment ramp-up circuit 200, which can be implemented in a slope compensation circuit of regulator 100. Ramp-up circuit 200 includes a first p-channel transistor ($M_{P1}$) 202, a second p-channel transistor ($M_{P2}$) 204, a third p-channel transistor ($M_{P3}$) 206, a first n-channel transistor ($M_{N1}$) 208, a second n-channel transistor ($M_{N2}$) 210, a first resistor ($R_1$) 212, a second resistor ($R_2$) 214, a first capacitor ($C_1$) 216, which may (or may not) be arranged as shown. Ramp-up circuit 200 may include additional components not shown.

The ramp-up circuit 200 generates a first increasing output current ($I_{RAMP}$) during the transition from the regulated voltage ($V_{REG}$) to the supply voltage ($V_{SUPPLY}$) and a second increasing output current ($I_{RAMP}$) during the transition from the supply voltage ($V_{SUPPLY}$) to the regulated voltage ($V_{REG}$). Ramp-up circuit 200 is configured to provide controlled and gradual changes in the output current ($I_{RAMP}$), which can be provided as the feedback current ($I_{FB}$) at the non-inverting input of error amplifier 110.

The ramp-up circuit 200 can be implemented using two separate current mirror configurations for handling different transition phases. The first current mirror includes the first p-channel transistor ($M_{P1}$) 202 and the second p-channel transistor ($M_{P2}$) 204. The first p-channel transistor ($M_{P1}$) 202 acts as the input transistor of the first current mirror, while the second p-channel transistor ($M_{P2}$) 204 acts as the output transistor, generating the first increasing output current ($I_{RAMP}$) during the transition from the regulated voltage ($V_{REG}$) to the supply voltage ($V_{SUPPLY}$).

The second current mirror includes the first p-channel transistor ($M_{P1}$) 202 and the third p-channel transistor ($M_{P3}$) 206. In this configuration, the first p-channel transistor ($M_{P1}$) 202 acts as the input transistor, and the third p-channel transistor ($M_{P3}$) 206 acts as the output transistor, generating the second increasing output current ($I_{RAMP}$) during the supply voltage ($V_{SUPPLY}$) to the regulated voltage ($V_{REG}$) transition.

To generate the output currents ($I_{RAMP}$), the ramp-up circuit 200 employs the first capacitor ($C_1$) 216, which is charged by a supply-dependent current, set by the first n-channel transistor ($M_{N1}$) 208 and the first resistor ($R_1$) 212. As the first capacitor ($C_1$) 216 charges, the voltage across it increases linearly with time. This linearly changing voltage is applied to the gate of the second n-channel transistor ($M_{N2}$) 210. As a result, the current flowing through the second n-channel transistor ($M_{N2}$) 210 changes proportionally, which in turn causes the output currents ($I_{RAMP}$) of both current mirrors to change linearly. The rate of change of the output currents ($I_{RAMP}$) is determined by the charging current set by the first n-channel transistor ($M_{N1}$) 208 and the first resistor ($R_1$) 212, as well as the capacitance value of the first capacitor ($C_1$) 216 and the supply voltage ($V_{SUPPLY}$).

The second resistor ($R_2$) 214 provides a voltage drop that ensures the proper biasing of the second n-channel transistor ($M_{N2}$) 210. The voltage drop across the second resistor ($R_2$) 214 helps to maintain the second n-channel transistor ($M_{N2}$) 210 in the desired operating region, enabling it to accurately mirror the charging current set by the first n-channel transistor ($M_{N1}$) 208 and the first resistor ($R_1$) 212.

In embodiments, the output currents ($I_{RAMP}$) generated by the ramp-up circuit 200 are provided as the feedback current ($I_{FB}$) at the non-inverting input of error amplifier 110. The feedback current ($I_{FB}$) changes gradually during transitions between the regulated voltage ($V_{REG}$) to the supply voltage ($V_{SUPPLY}$). The rate of change of the feedback current ($I_{FB}$) is controlled by the slope of the output currents ($I_{RAMP}$) generated by the ramp-up circuit 200.

In embodiments, the ramp-up circuit 200 is activated by a control signal applied to the gate of the first n-channel transistor ($M_{N1}$) 208. When the control signal is de-asserted, the first n-channel transistor ($M_{N1}$) 208 is turned OFF, enabling the charging of the first capacitor ($C_1$) 216 through the first resistor ($R_1$) 212. As the first capacitor ($C_1$) 216 charges, the increasing voltage turns on the second n-channel transistor ($M_{N2}$) 210 gradually, generating the ramping output currents ($I_{RAMP}$). The control signal remains de-asserted for the transition phase, ensuring a smooth and controlled transition between the supply voltage ($V_{SUPPLY}$) and the regulated voltage ($V_{REG}$).

Figure 3:
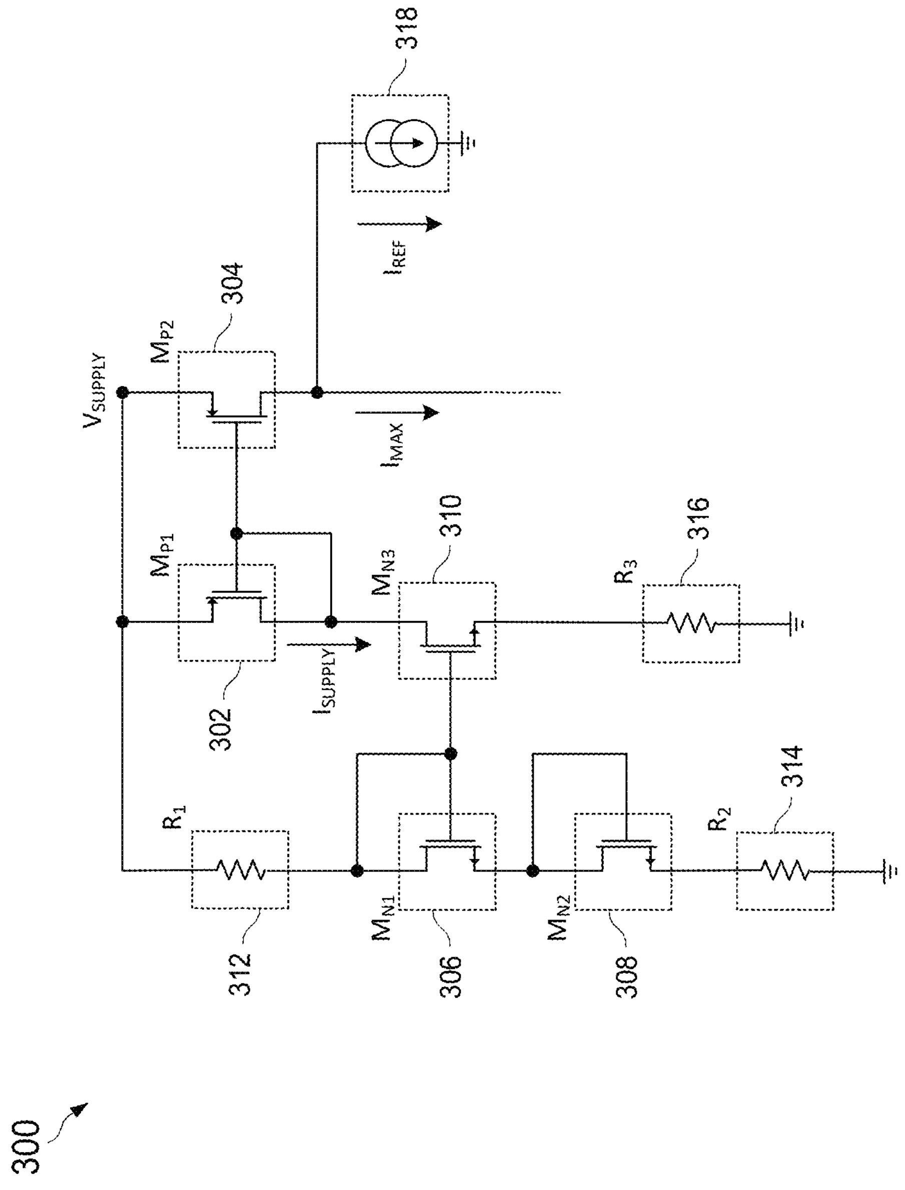
FIG. 3 is a schematic of an embodiment current generation circuit.

FIG. 3 illustrates a schematic of an embodiment current generation circuit 300. The current generation circuit 300 includes a first p-channel transistor ($M_{P1}$) 302, a second p-channel transistor ($M_{P2}$) 304, a first n-channel transistor ($M_{N1}$) 306, a second n-channel transistor ($M_{N2}$) 308, a third n-channel transistor ($M_{N3}$) 310, a first resistor ($R_1$) 312, a second resistor ($R_2$) 314, a third resistor ($R_3$) 316, and a current source 318, which may (or may not) be arranged as shown. Current generation circuit 300 may include additional components not shown.

The current generation circuit 300 is configured to generate a constant current ($I_{MAX}$) that accurately tracks the supply voltage ($V_{SUPPLY}$). The constant current ($I_{MAX}$) creates a decreasing ramp current by subtracting the constant current ($I_{MAX}$) from an increasing ramp current ($I_{RAMP}$) generated by the ramp-up circuit 200. The resulting decreasing current is pulled from the feedback branch during the transition from the supply voltage ($V_{SUPPLY}$) to the regulated voltage ($V_{REG}$).

In many devices, the supply voltage ($V_{SUPPLY}$) has a wide operating range. To ensure accurate operation across this range, the constant current ($I_{MAX}$) varies proportional with the supply voltage ($V_{SUPPLY}$). This supply dependent behavior ensures proper tracking between the output voltage ($V_{OUT}$) and the supply voltage ($V_{SUPPLY}$) during The current generation circuit 300 generates a stable constant current ($I_{MAX}$) that sets the upper limit for the feedback current ($I_{FB}$) during the transition from the supply voltage ($V_{SUPPLY}$) to the regulated voltage ($V_{REG}$).

The current generation circuit 300 utilizes a current mirror configuration that includes the first p-channel transistor ($M_{P1}$) 302 and the second p-channel transistor ($M_{P2}$) 304. The first p-channel transistor ($M_{P1}$) 302 acts as the input transistor of the current mirror, while the second p-channel transistor ($M_{P2}$) 304 acts as the output transistor, generating the constant current ($I_{MAX}$).

To generate the constant current ($I_{MAX}$), the current generation circuit 300 employs a supply-dependent current source formed by the first n-channel transistor ($M_{N1}$) 306, the second n-channel transistor ($M_{N2}$) 308, and the first resistor ($R_1$) 312 and the second resistor ($R_2$) 314. The current flowing through this branch is proportional to the supply voltage ($V_{SUPPLY}$) and is mirrored by the first p-channel transistor ($M_{P1}$) 302 and the second p-channel transistor ($M_{P2}$) 304.

The current generation circuit 300 also includes a reference current branch formed by the current source 318. This current source generates a constant reference current ($I_{REF}$), proportional to the reference voltage ($V_{REF}$), that is subtracted from the supply-dependent current mirrored by the second p-channel transistor ($M_{P2}$) 304. The resulting current, the difference between the supply-dependent current and the reference current, forms the constant current ($I_{MAX}$) of the current generation circuit 300.

The third n-channel transistor ($M_{N3}$) 310 and the third resistor ($R_3$) 316 form a current branch that generates a current equal to $$\frac{V_{SUPPLY}}{R_1}.$$

The resistance of the third resistor ($R_3$) 316 is set to be half of the first resistor ($R_1$) 312 (i.e., $$R_3 = \frac{R_1}{2}$$

which ensures that the current flowing through the third n-channel transistor ($M_{N3}$) 310 is proportional to the supply voltage ($V_{SUPPLY}$) divided by the first resistor ($R_1$) 312.

The current source 318 is designed to sink a current equal to $$\frac{V_{REF}}{(R_1||R_2)},$$

where $V_{REF}$ is a reference voltage, and $R_1$ and $R_2$ are the resistances of the first resistor ($R_1$) 104 and the second resistor ($R_2$) 106, respectively. This reference current is subtracted from the current generated by the third n-channel transistor ($M_{N3}$) 310 and the third resistor ($R_3$) 316 branch.

The constant current ($I_{MAX}$) generated by the current generation circuit 300 is given by the equation:

$$I_{MAX} = \frac{V_{SUPPLY}}{R_1} - \frac{V_{REF}}{(R_1||R_2)}.$$

This equation represents the difference between the current generated by the by the third n-channel transistor ($M_{N3}$) 310 and the third resistor ($R_3$) 316 branch (i.e., $$\frac{V_{SUPPLY}}{R_1}$$

and the reference current sunk by the current source 318 (i.e., $$\frac{V_{REF}}{(R_1||R_2)}$$

By setting the constant current ($I_{MAX}$) based on the supply voltage ($V_{SUPPLY}$), the current ramp-down phase adapts to the varying supply conditions, maintaining the desired output voltage ($V_{OUT}$) equal to the supply voltage ($V_{SUPPLY}$) throughout the transition.

The second n-channel transistor ($M_{N2}$) 308 and the second resistor (R2) 314 create a voltage drop that matches the voltage drop across the first n-channel transistor ($M_{N1}$) 306 and the first resistor ($R_1$) 312. The circuit maintains a proper balance between the supply-dependent current and the reference current by ensuring that the voltage drops across these two branches are equal.

The constant current ($I_{MAX}$) sets the upper limit for the feedback current ($I_{FB}$) during the transition from the supply voltage ($V_{SUPPLY}$) to the regulated voltage ($V_{REG}$). The ramp-up circuit 200, which is repurposed to generate a linearly increasing current ($I_{RAMP}$) during the ramp-down phase, creates the decreasing feedback current ($I_{FB}$). The linearly increasing current ($I_{RAMP}$) generated by the ramp-up circuit 200 is subtracted from the constant current ($I_{MAX}$) to form the feedback current ($I_{FB}$) during the transition.

The current generation circuit 300 works with the ramp-up circuit 200 to form the feedback current source 112 shown in FIG. 1. During the transition from the regulated voltage ($V_{REG}$) to the supply voltage ($V_{SUPPLY}$), the ramp-up circuit 200 generates an increasing current that is subtracted from the feedback branch. Conversely, during the transition from the supply voltage ($V_{SUPPLY}$) to the regulated voltage ($V_{REG}$), the ramp-up circuit 200 is repurposed to generate a linearly increasing current ($I_{RAMP}$) that is subtracted from the constant current ($I_{MAX}$) to create the decreasing feedback current ($I_{FB}$).

By employing the current generation circuit 300 and the ramp-up circuit 200, the feedback current source 112 achieves smooth and controlled transitions of the output voltage ($V_{OUT}$) between the regulated voltage ($V_{REG}$) and the supply voltage ($V_{SUPPLY}$). The linearly increasing and decreasing currents generated by these circuits help to minimize undershoot, overshoot, and disturbances to downstream circuits, enhancing the overall performance and reliability of the regulator 100.

The supply-dependent characteristic of the constant current ($I_{MAX}$) eliminates the start-up delay observed in previous solutions at lower supply voltages. By dynamically adjusting the constant current ($I_{MAX}$) based on the supply voltage ($V_{SUPPLY}$), a smooth and seamless transition from the regulated voltage ($V_{REG}$) to the supply voltage ($V_{SUPPLY}$) can be guaranteed, regardless of the supply voltage level.

Figure 4:
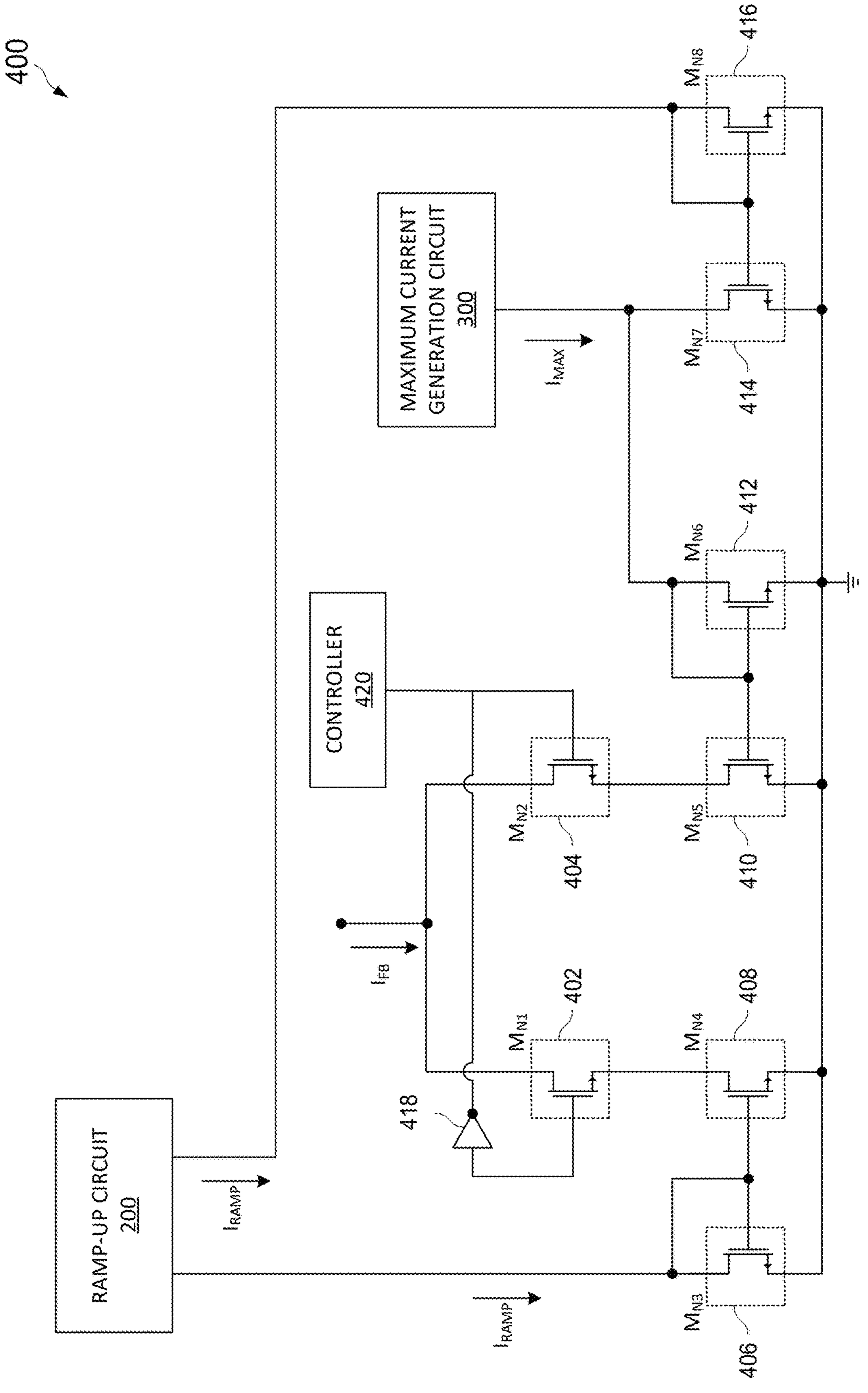
FIG. 4 is a schematic of an embodiment slope compensation circuit.

FIG. 4 illustrates a schematic of an embodiment slope compensation circuit 400, which can be implemented in regulator 100 to generate the feedback current ($I_{FB}$) for controlling the output voltage transitions. The slope compensation circuit 400 includes a ramp-up circuit 200 and a current generation circuit 300, along with additional components such as a first n-channel transistor ($M_{N1}$) 402, a second n-channel transistor ($M_{N2}$) 404, a third n-channel transistor ($M_{N3}$) 406, a fourth n-channel transistor ($M_{N4}$) 408, a fifth n-channel transistor ($M_{N5}$) 410, a sixth n-channel transistor ($M_{N6}$) 412, a seventh n-channel transistor ($M_{N7}$) 414, an eighth n-channel transistor ($M_{N8}$) 416, an inverter 418, and a controller 420, which may (or may not) be arranged as shown. The slope compensation circuit 400 may include additional components not shown.

The ramp-up circuit 200 generates a first increasing current ($I_{RAMP}$) during the transition from the regulated voltage ($V_{REG}$) to the supply voltage ($V_{SUPPLY}$) and a second increasing current ($I_{RAMP}$) during the transition from the supply voltage ($V_{SUPPLY}$) to the regulated voltage ($V_{REG}$). In contrast, the current generation circuit 300 generates a stable constant current ($I_{MAX}$) that sets the upper limit for the feedback current ($I_{FB}$) during the transition from the supply voltage ($V_{SUPPLY}$) to the regulated voltage ($V_{REG}$).

The slope compensation circuit 400 uses the increasing current ($I_{RAMP}$) generated by the ramp-up circuit 200 and the constant current ($I_{MAX}$) generated by the current generation circuit 300 to create the feedback current ($I_{FB}$) with the desired slope characteristics. The third n-channel transistor ($M_{N3}$) 406 and the fourth n-channel transistor ($M_{N4}$) 408 form a current mirror that mirrors the increasing current ($I_{RAMP}$) from the ramp-up circuit 200. This mirrored current is pulled by the feedback branch through the first n-channel transistor ($M_{N1}$) 402 during the transition from the regulated voltage ($V_{REG}$) to the supply voltage ($V_{SUPPLY}$).

During the transition from the supply voltage ($V_{SUPPLY}$) to the regulated voltage ($V_{REG}$), the ramp-up circuit 200 generates the increasing current ramp ($I_{RAMP}$), which is subtracted from the constant current ($I_{MAX}$) generated by the current generation circuit 300, to obtain the decreasing current ramp ($I_{FB}$). The latter is then pulled by the feedback branch.

The first n-channel transistor ($M_{N1}$) 402 acts as a switch to control the flow of the increasing current ($I_{RAMP}$) from the ramp-up circuit 200 to the feedback current ($I_{FB}$) output. When the first n-channel transistor ($M_{N1}$) 402 is turned ON, it allows the increasing current ($I_{RAMP}$) to be pulled from the feedback branch during the transition from the regulated voltage ($V_{REG}$) to the supply voltage ($V_{SUPPLY}$). Conversely, when the first n-channel transistor ($M_{N1}$) 402 is turned OFF, it prevents the increasing current ($I_{RAMP}$) from affecting the feedback branch during the transition from the supply voltage ($V_{SUPPLY}$) to the regulated voltage ($V_{REG}$).

The first n-channel transistor ($M_{N1}$) 402 and the second n-channel transistor ($M_{N2}$) 404 form a switching network that selects between the increasing current ($I_{RAMP}$) and the decreasing current based on the operating mode of the regulator 100. During the transition from the regulated voltage ($V_{REG}$) to the supply voltage ($V_{SUPPLY}$), the switching network allows the increasing current ($I_{RAMP}$) to be pulled to the feedback branch. Conversely, during the transition from the supply voltage ($V_{SUPPLY}$) to the regulated voltage ($V_{REG}$), the switching network enables the linearly increasing current ($I_{RAMP}$) to be subtracted from the constant current ($I_{MAX}$) to create the decreasing current.

Inverter 418 is coupled between the gate terminal of the first n-channel transistor ($M_{N1}$) 402 and the gate terminal of the second n-channel transistor ($M_{N2}$) 404. It allows selection between increasing or decreasing ramp currents generated by slope compensation circuit 400. In embodiments, the controller 420 is configured to set the control signal at the gate terminals of the first n-channel transistor ($M_{N1}$) 402 and the gate terminal of the second n-channel transistor ($M_{N2}$) 404.

The seventh n-channel transistor ($M_{N7}$) 414 and the eighth n-channel transistor ($M_{N8}$) 416 mirror the increasing current ramp generated by the ramp-up circuit 200, which is subtracted from the constant current ($I_{MAX}$).

Figure 5:
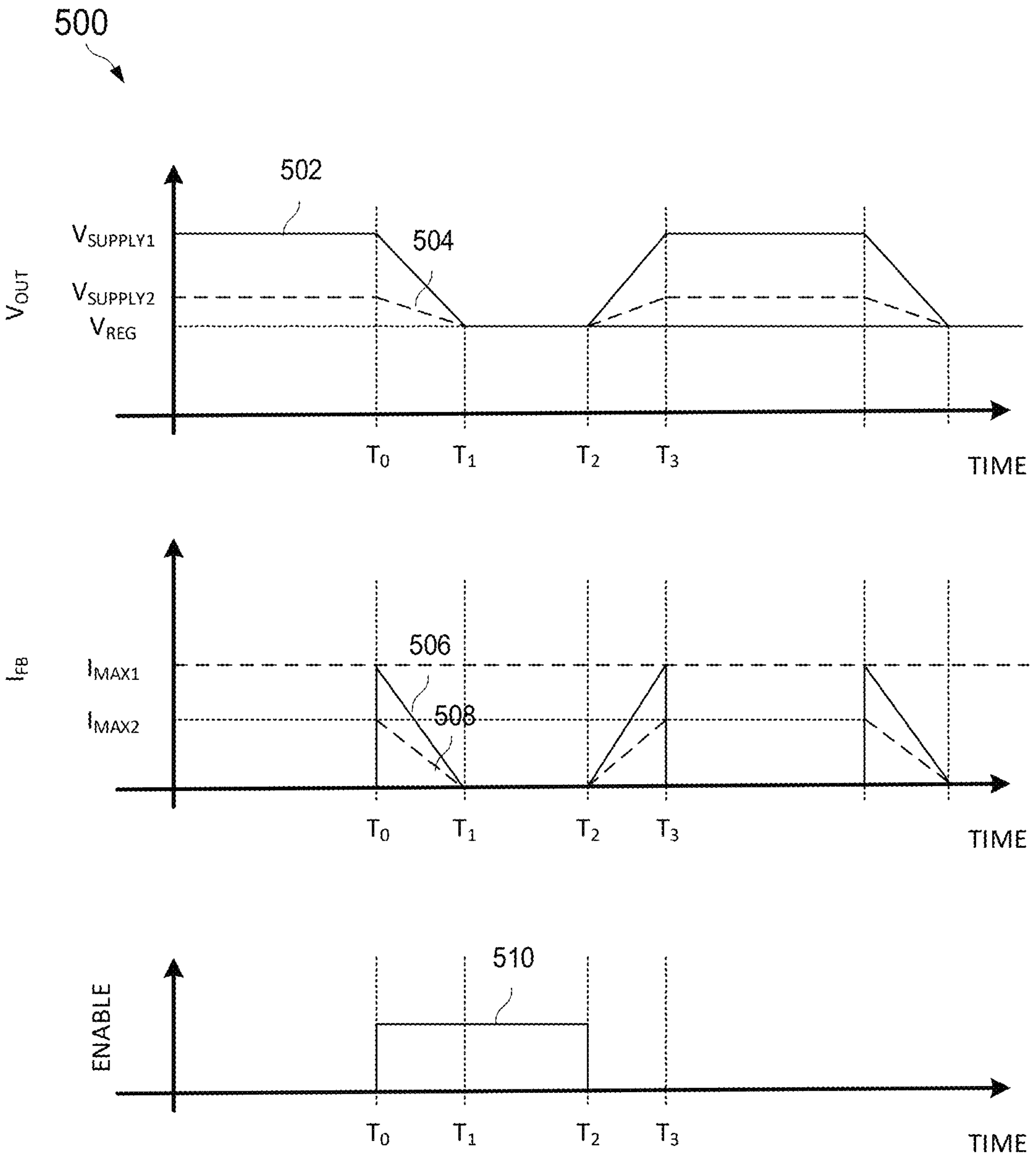
FIG. 5 shows waveforms associated with the operation of the regulator and the slope compensation circuit for two different supply voltages ($V_{SUPPLY1}$ and $V_{SUPPLY2}$)

FIG. 5 illustrates the waveforms associated with the operation of regulator 100 and the slope compensation circuit 400 for two different supply voltages ($V_{SUPPLY1}$ and $V_{SUPPLY2}$). The top graph shows the output voltage ($V_{OUT}$) of the regulator 100 over time for the two different supply voltages. The middle graph depicts the constant currents ($I_{MAX1}$ and $I_{MAX2}$) generated by the current generation circuit 300 for each supply voltage. The bottom graph represents the enable signal that controls the mode transitions of regulator 100.

Before time $T_0$, regulator 100 operates in the low-power mode, with the output voltage ($V_{OUT}$) equal to the first supply voltage ($V_{SUPPLY1}$) 502. At time $T_0$, the constant current ($I_{MAX1}$) 506 generated by the current generation circuit 300 is at its highest level, determined by the first supply voltage ($V_{SUPPLY1}$) 502 at that time.

At time $T_0$, the enable signal transitions from low to high, triggering the regulator 100 to switch from the low-power mode to the high-power mode. The ramp-up circuit 200 within the slope compensation circuit 400 generates an increasing current ($I_{RAMP}$) that is subtracted from the constant current ($I_{MAX1}$) 506. This generates a decreasing current ramp, causing a gradual decrease of the output voltage ($V_{OUT}$) from the first supply voltage ($V_{SUPPLY1}$) towards the regulated voltage ($V_{REG}$). During this transition, the actual constant current used by the slope compensation circuit 400 remains constant at the level determined by the current generation circuit 300 at time $T_0$.

Similarly, when the supply voltage is at the second level ($V_{SUPPLY2}$), regulator 100 operates in the low-power mode until the enable signal transitions from low to high. At this point, the ramp-up circuit 200 generates an increasing current ($I_{RAMP}$) that causes a gradual decrease of the output voltage ($V_{OUT}$) from the second supply voltage ($V_{SUPPLY2}$) towards the regulated voltage ($V_{REG}$) 504. The constant current ($I_{MAX2}$) generated by the current generation circuit 300 is determined by the second supply voltage ($V_{SUPPLY2}$) at the time of the transition.

At time $T_2$, the enable signal transitions from high to low, triggering the regulator 100 to switch from the high-power mode back to the low-power mode. The ramp-up circuit 200 within the slope compensation circuit 400 is repurposed to generate an increasing current ($I_{RAMP}$) pulled from the feedback branch. This causes the feedback current ($I_{FB}$) to increase gradually, allowing the output voltage ($V_{OUT}$) to rise from the regulated voltage ($V_{REG}$) towards the corresponding supply voltage ($V_{SUPPLY1}$ or $V_{SUPPLY2}$).

The slope compensation circuit 400, which includes the ramp-up circuit 200 and the current generation circuit 300, ensures smooth and controlled transitions between the low-power and high-power modes of the regulator 100 for different supply voltages. By generating the appropriate increasing and decreasing currents ($I_{RAMP}$) and utilizing the supply-dependent constant current ($I_{MAX}$), the slope compensation circuit 400 minimizes undershoot, overshoot, and disturbances to downstream circuits during mode transitions, enhancing the overall performance and reliability of the regulator 100 across a wide range of supply voltages.

By employing the slope compensation circuit 400, which combines the ramp-up circuit 200 and the current generation circuit 300, the regulator 100 achieves smooth and controlled transitions of the output voltage ($V_{OUT}$) between the regulated voltage ($V_{REG}$) and the supply voltage ($V_{SUPPLY}$). The linearly increasing and decreasing currents generated by the ramp-up circuit 200, along with the stable constant current ($I_{MAX}$) provided by the current generation circuit 300, help to minimize undershoot, overshoot, and disturbances to downstream circuits, enhancing the overall performance and reliability of the regulator 100.

Figure 6:
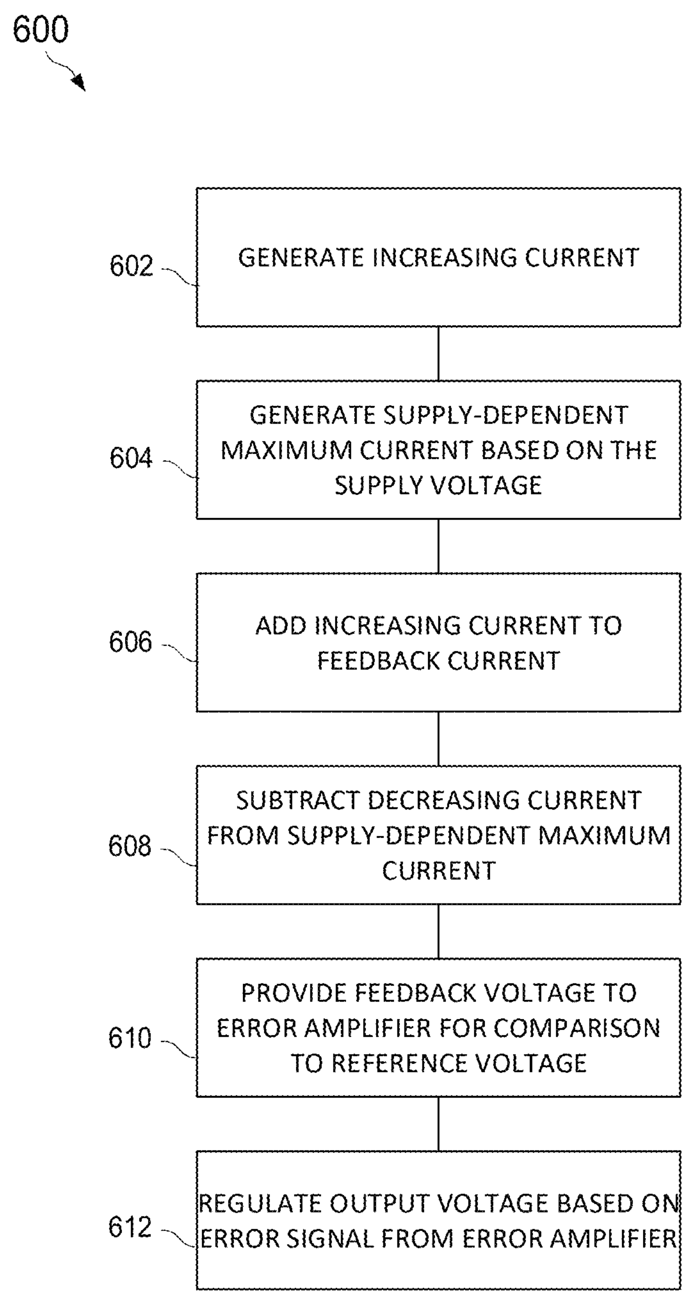
FIG. 6 is a flowchart of an embodiment method for controlling a voltage regulator circuit.

FIG. 6 illustrates a flowchart of an embodiment method 600 for controlling a voltage regulator circuit. It is noted that all steps outlined in the flow charts of the method are not necessarily required and can be optional. Further, changes to the arrangement of the steps, removal of one or more steps and path connections, and addition of steps and path connections are similarly contemplated.

At step 602, an increasing current is generated by a ramp-up circuit. The increasing current may be generated by charging a capacitor in the ramp-up circuit, and the rate of increase may be controlled by the charging of the capacitor. The charging and discharging of the capacitor can be controlled by switches, such as a switch that controls the connection between the capacitor and a ground terminal.

At step 604, a supply-dependent constant current is generated by a current generation circuit based on the supply voltage. The supply-dependent constant current may be generated by first generating a supply-dependent current using a voltage-to-current converter circuit. The supply-dependent current can be generated by providing the supply voltage across a resistor and controlling the current through the resistor using a transistor, where the control terminal of the transistor is coupled to a bias voltage. The supply-dependent current is then mirrored using a current mirror circuit to generate the supply-dependent constant current.

At step 606, the increasing current generated by the ramp-up circuit is pulled to the feedback branch. It flows through the feedback network during a first mode transition from regulated to supply voltage. Pulling the increasing current to the feedback current helps smoothly transition the output voltage from the regulated voltage to the supply voltage.

During a second mode transition from the supply voltage to the regulated voltage, method 600 moves to step 608, where an increasing current is subtracted from the supply-dependent constant current to generate the feedback current flowing through the feedback network. The slope compensation circuit also performs this subtraction. The subtraction of the increasing current from the supply-dependent constant current helps to smoothly transition the output voltage from the supply voltage back to the regulated voltage.

At step 610, the feedback network provides a feedback voltage to an input of an error amplifier. The error amplifier compares the feedback voltage to a reference voltage and generates an error signal based on the comparison. The error signal is then provided to a control terminal of a first transistor.

Finally, at step 612, the output voltage at an output node is regulated based on the error signal from the error amplifier. The output node is coupled to a second terminal of the first transistor, while the first terminal of the first transistor is coupled to the supply voltage. The regulation of the output voltage based on the error signal helps to maintain a stable and accurate output voltage level.

Throughout method 600, a control circuit may control the operation of switches in the slope compensation circuit based on the mode of operation of the voltage regulator circuit. For example, a first switch coupled between the ramp-up circuit and the feedback network and a second switch coupled between the current generation circuit and the feedback network may be controlled by the control circuit to ensure proper operation during different modes of the voltage regulator circuit.

In embodiments, regulator 100 can be employed with the slope compensation circuit 400, with a supply-dependent current ramp generator that effectively tackles the challenges associated with operating across a wide range of battery voltages. Advantageously, the constant current ($I_{MAX}$) is based on the supply voltage ($V_{SUPPLY}$), ensuring optimal performance and efficiency regardless of the battery voltage level.

Advantageously, the supply-dependent current ramp generator eliminates startup delays commonly encountered in conventional solutions, mainly when operating at lower supply voltages. In conventional fixed-current approaches, the constant current remains constant regardless of the supply voltage, leading to startup delays and inefficiencies at lower battery voltages. However, with the proposed system, the constant current automatically adjusts to the supply voltage level, ensuring optimal performance and eliminating startup delays across the entire range of battery voltages.

This feature can be particularly beneficial in automotive applications, where battery voltage can vary significantly depending on the state of charge, temperature, and load conditions. By adapting to these voltage variations, the voltage regulator can maintain stable and efficient operation, improving the overall performance and reliability of the automotive electrical system.

A first aspect relates to a voltage regulator circuit, comprising a first transistor having a first terminal, a second terminal, and a control terminal, the first terminal coupled to a supply voltage, a second terminal of the first transistor coupled to an output node; an error amplifier having a first input, a second input, and an output, the first input coupled to a reference voltage, the output coupled to the control terminal of the first transistor; a feedback network coupled between the output node and a ground terminal, the feedback network configured to provide a feedback voltage to the second input of the error amplifier; and a slope compensation circuit coupled to the feedback network, the slope compensation circuit comprising a ramp-up circuit configured to generate an increasing current, and a current generation circuit configured to generate a supply-dependent constant current based on the supply voltage, wherein the slope compensation circuit is configured to draw the increasing current during a first mode transition from a regulated voltage to the supply voltage, and draw a decreasing current during a second mode transition from the supply voltage to the regulated voltage, the decreasing current generated by subtracting the increasing current from the supply-dependent constant current.

In a first implementation form of the voltage regulator, according to the first aspect as such, the ramp-up circuit comprises a first current mirror circuit configured to generate the increasing current; and a capacitor coupled to the first current mirror circuit, wherein the increasing current is generated based on a charging of the capacitor.

In a second implementation form of the voltage regulator, according to the first aspect as such or any preceding implementation form of the first aspect, the ramp-up circuit further comprises a first switch coupled between the first current mirror circuit and the feedback network; and a second switch coupled between the capacitor and a ground terminal, the second switch configured to control the charging and discharging of the capacitor.

In a third implementation form of the voltage regulator, according to the first aspect as such or any preceding implementation form of the first aspect, the current generation circuit comprises a second current mirror circuit configured to generate the supply-dependent constant current; and a voltage-to-current converter circuit coupled to the second current mirror circuit, the voltage-to-current converter circuit configured to generate a supply-dependent current based on the supply voltage.

In a fourth implementation form of the voltage regulator, according to the first aspect as such or any preceding implementation form of the first aspect, the voltage-to-current converter circuit comprises a resistor coupled between the supply voltage and a first node; and a first transistor having a first terminal coupled to the first node, a second terminal coupled to a ground terminal, and a control terminal coupled to a bias voltage.

In a fifth implementation form of the voltage regulator, according to the first aspect as such or any preceding implementation form of the first aspect, the slope compensation circuit further comprises a first switch coupled between the ramp-up circuit and the feedback network; a second switch coupled between the current generation circuit and the feedback network; and a control circuit configured to control the first and second switches based on a mode of operation of the voltage regulator circuit.

In a sixth implementation form of the voltage regulator, according to the first aspect as such or any preceding implementation form of the first aspect, wherein during the first mode transition, the slope compensation circuit is configured to linearly decrease the feedback current from the supply voltage to the regulated voltage, and wherein during the second mode transition, the slope compensation circuit is configured to linearly increase the feedback current from the regulated voltage to the supply voltage.

A second aspect relates to a slope compensation circuit for a regulator, the slope compensation circuit comprising a ramp-up circuit configured to generate an increasing current; and a current generation circuit configured to generate a supply-dependent constant current based on a supply voltage of the regulator, wherein the slope compensation circuit is configured to draw the increasing current during a first mode transition from a regulated voltage to the supply voltage, and draw a decreasing current during a second mode transition from the supply voltage to the regulated voltage, the decreasing current generated by subtracting the increasing current from the supply-dependent constant current.

In a first implementation form of the slope compensation circuit, according to the second aspect as such, the ramp-up circuit comprises a first current mirror circuit configured to generate the increasing current; and a capacitor coupled to the first current mirror circuit, wherein the increasing current is generated based on a charging of the capacitor.

In a second implementation form of the slope compensation circuit, according to the second aspect as such or any preceding implementation form of the second aspect, the ramp-up circuit further comprises a first switch coupled between the first current mirror circuit and the feedback network; and a second switch coupled between the capacitor and a ground terminal, wherein the second switch is configured to control the charging and discharging of the capacitor.

In a third implementation form of the slope compensation circuit, according to the second aspect as such or any preceding implementation form of the second aspect, the current generation circuit comprises a second current mirror circuit configured to generate the supply-dependent constant current; and a voltage-to-current converter circuit coupled to the second current mirror circuit, the voltage-to-current converter circuit configured to generate a supply-dependent current based on the supply voltage.

In a fourth implementation form of the slope compensation circuit, according to the second aspect as such or any preceding implementation form of the second aspect, the voltage-to-current converter circuit comprises a resistor coupled between the supply voltage and a first node; and a first transistor having a first terminal coupled to the first node, a second terminal coupled to a ground terminal, and a control terminal coupled to a bias voltage.

In a fifth implementation form of the slope compensation circuit, according to the second aspect as such or any preceding implementation form of the second aspect, the slope compensation circuit further comprises a first switch coupled between the ramp-up circuit and the feedback network; a second switch coupled between the current generation circuit and the feedback network; and a control circuit configured to control the first and second switches based on an operation mode of the voltage regulator circuit.

In a sixth implementation form of the slope compensation circuit, according to the second aspect as such or any preceding implementation form of the second aspect, during the first mode transition, the slope compensation circuit is configured to linearly decrease the feedback current from the supply voltage to the regulated voltage, and during the second mode transition, the slope compensation circuit is configured to linearly increase the feedback current from the regulated voltage to the supply voltage.

A third aspect relates to a method for controlling a voltage regulator circuit, the method comprising generating, by a ramp-up circuit, an increasing current; generating, by a current generation circuit, a supply-dependent constant current based on a supply voltage; drawing, by a slope compensation circuit, the increasing current during a first mode transition from a regulated voltage to the supply voltage; drawing, by the slope compensation circuit, a decreasing current during a second mode transition from the supply voltage to the regulated voltage, the decreasing current generated by subtracting the increasing current from the supply-dependent constant current; providing, by the feedback network, a feedback voltage to an input of an error amplifier; comparing, by the error amplifier, the feedback voltage to a reference voltage to generate an error signal; providing the error signal to a control terminal of a first transistor; and regulating an output voltage at an output node based on the error signal, the output node coupled to a second terminal of the first transistor, and a first terminal of the first transistor coupled to the supply voltage.

In a first implementation form of the method, according to the third aspect as such, generating the increasing current comprises charging a capacitor in the ramp-up circuit; and generating the increasing current based on the charging of the capacitor.

In a second implementation form of the method, according to the third aspect as such or any preceding implementation form of the third aspect, the method further comprising controlling, by a first switch, a connection between the ramp-up circuit and the feedback network; and controlling, by a second switch, a connection between the capacitor and a ground terminal, wherein the second switch is configured to control the charging and discharging of the capacitor.

In a third implementation form of the method, according to the third aspect as such or any preceding implementation form of the third aspect, generating the supply-dependent constant current comprises generating, by a voltage-to-current converter circuit, a supply-dependent current based on the supply voltage; and mirroring the supply-dependent current using a current mirror circuit to generate the supply-dependent constant current.

In a fourth implementation form of the method, according to the third aspect as such or any preceding implementation form of the third aspect, generating the supply-dependent current comprises providing the supply voltage across a resistor; and controlling a current through the resistor using a transistor, wherein a control terminal of the transistor is coupled to a bias voltage.

In a fifth implementation form of the method, according to the third aspect as such or any preceding implementation form of the third aspect, the method further comprising controlling, by a control circuit, a first switch coupled between the ramp-up circuit and the feedback network and a second switch coupled between the current generation circuit and the feedback network based on a mode of operation of the voltage regulator circuit.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A voltage regulator circuit, comprising:

a first transistor having a first terminal, a second terminal, and a control terminal, the first terminal coupled to a supply voltage, a second terminal of the first transistor coupled to an output node;

an error amplifier having a first input, a second input, and an output, the first input coupled to a reference voltage, the output coupled to the control terminal of the first transistor;

a feedback network coupled between the output node and a ground terminal, the feedback network configured to provide a feedback voltage to the second input of the error amplifier; and a slope compensation circuit coupled to the feedback network, the slope compensation circuit comprising:

a ramp-up circuit configured to generate an increasing current, and a current generation circuit configured to generate a supply-dependent constant current based on the supply voltage, wherein the slope compensation circuit is configured to:

draw the increasing current during a first mode transition from a regulated voltage to the supply voltage, and draw a decreasing current during a second mode transition from the supply voltage to the regulated voltage, the decreasing current generated by subtracting the increasing current from the supply-dependent constant current.

2. The voltage regulator circuit of claim 1, wherein the ramp-up circuit comprises:

a current mirror circuit configured to generate the increasing current; and a capacitor coupled to the first current mirror circuit, wherein the increasing current is generated based on a charging of the capacitor.

3. The voltage regulator circuit of claim 2, wherein the ramp-up circuit further comprises:

a first switch coupled between the first current mirror circuit and the feedback network; and a second switch coupled between the capacitor and a ground terminal, the second switch configured to control the charging and discharging of the capacitor.

4. The voltage regulator circuit of claim 1, wherein the current generation circuit comprises:

a current mirror circuit configured to generate the supply-dependent constant current; and a voltage-to-current converter circuit coupled to the second current mirror circuit, the voltage-to-current converter circuit configured to generate a supply-dependent current based on the supply voltage.

5. The voltage regulator circuit of claim 4, wherein the voltage-to-current converter circuit comprises:

a resistor coupled to the supply voltage; and a second transistor coupled to the resistor.

6. The voltage regulator circuit of claim 1, wherein the slope compensation circuit further comprises:

a first switch coupled between the ramp-up circuit and the feedback network;

a second switch coupled between the current generation circuit and the feedback network; and a control circuit configured to control the first switch and the second switch based on a mode of operation of the voltage regulator circuit.

7. The voltage regulator circuit of claim 1, wherein during the first mode transition, the slope compensation circuit is configured to linearly decrease the feedback current from the supply voltage to the regulated voltage, and wherein during the second mode transition, the slope compensation circuit is configured to linearly increase the feedback current from the regulated voltage to the supply voltage.

8. A slope compensation circuit for a regulator, the slope compensation circuit comprising:

a ramp-up circuit configured to generate an increasing current; and a current generation circuit configured to generate a supply-dependent constant current based on a supply voltage of the regulator, wherein the slope compensation circuit is configured to:

draw the increasing current during a first mode transition from a regulated voltage to the supply voltage, and draw a decreasing current during a second mode transition from the supply voltage to the regulated voltage, the decreasing current generated by subtracting the increasing current from the supply-dependent constant current.

9. The slope compensation circuit of claim 8, wherein the ramp-up circuit comprises:

a current mirror circuit configured to generate the increasing current; and a capacitor coupled to the current mirror circuit, wherein the increasing current is generated based on a charging of the capacitor.

10. The slope compensation circuit of claim 9, wherein the ramp-up circuit further comprises:

a first switch coupled between the current mirror circuit and the feedback network; and a second switch coupled between the capacitor and a ground terminal, wherein the second switch is configured to control the charging and discharging of the capacitor.

11. The slope compensation circuit of claim 8, wherein the current generation circuit comprises:

a current mirror circuit configured to generate the supply-dependent constant current; and a voltage-to-current converter circuit coupled to the current mirror circuit, the voltage-to-current converter circuit configured to generate a supply-dependent current based on the supply voltage.

12. The slope compensation circuit of claim 11, wherein the voltage-to-current converter circuit comprises:

a resistor coupled to the supply voltage; and a second transistor coupled to the resistor.

13. The slope compensation circuit of claim 8, wherein the slope compensation circuit further comprises:

a first switch coupled between the ramp-up circuit and the feedback network;

a second switch coupled between the current generation circuit and the feedback network; and a control circuit configured to control the first switch and the second switch based on an operation mode of the voltage regulator circuit.

14. The slope compensation circuit of claim 8, wherein during the first mode transition, the slope compensation circuit is configured to linearly decrease the feedback current from the supply voltage to the regulated voltage, and wherein during the second mode transition, the slope compensation circuit is configured to linearly increase the feedback current from the regulated voltage to the supply voltage.

15. A method for controlling a voltage regulator circuit, the method comprising:

generating, by a ramp-up circuit, an increasing current;

generating, by a current generation circuit, a supply-dependent constant current based on a supply voltage;

drawing, by a slope compensation circuit, the increasing current during a first mode transition from a regulated voltage to the supply voltage;

drawing, by the slope compensation circuit, a decreasing current during a second mode transition from the supply voltage to the regulated voltage, the decreasing current generated by subtracting the increasing current from the supply-dependent constant current;

providing, by the feedback network, a feedback voltage to an input of an error amplifier;

comparing, by the error amplifier, the feedback voltage to a reference voltage to generate an error signal;

providing the error signal to a control terminal of a transistor; and regulating an output voltage at an output node based on the error signal, the output node coupled to a second terminal of the transistor, and a first terminal of the transistor coupled to the supply voltage.

16. The method of claim 15, wherein generating the increasing current comprises:

charging a capacitor in the ramp-up circuit; and generating the increasing current based on the charging of the capacitor.

17. The method of claim 16, further comprising:

controlling, by a first switch, a connection between the ramp-up circuit and the feedback network; and controlling, by a second switch, a connection between the capacitor and a ground terminal, wherein the second switch is configured to control the charging and discharging of the capacitor.

18. The method of claim 15, wherein generating the supply-dependent constant current comprises:

generating, by a voltage-to-current converter circuit, a supply-dependent current based on the supply voltage; and mirroring the supply-dependent current using a current mirror circuit to generate the supply-dependent constant current.

19. The method of claim 18, wherein generating the supply-dependent current comprises:

providing the supply voltage across a resistor; and controlling a current through the resistor using a second transistor, wherein a control terminal of the second transistor is coupled to a bias voltage.

20. The method of claim 15, further comprising controlling, by a control circuit, a first switch coupled between the ramp-up circuit and the feedback network and a second switch coupled between the current generation circuit and the feedback network based on a mode of operation of the voltage regulator circuit.

* * * * *